(12) United States Patent
Xiao et al.

(10) Patent No.: US 11,133,009 B2
(45) Date of Patent: Sep. 28, 2021

(54) METHOD, APPARATUS, AND TERMINAL DEVICE FOR AUDIO PROCESSING BASED ON A MATCHING OF A PROPORTION OF SOUND UNITS IN AN INPUT MESSAGE WITH CORRESPONDING SOUND UNITS IN A DATABASE

(71) Applicant: Alibaba Group Holding Limited, Grand Cayman (KY)

(72) Inventors: Yeming Xiao, Beijing (CN); Jie Gao, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 224 days.

(21) Appl. No.: 16/213,751

(22) Filed: Dec. 7, 2018

(65) Prior Publication Data

US 2019/0180752 A1    Jun. 13, 2019

(30) Foreign Application Priority Data

Dec. 8, 2017 (CN) .......................... 201711296558.9

(51) Int. Cl.
| | |
|---|---|
| *G10L 15/30* | (2013.01) |
| *G06N 5/04* | (2006.01) |
| *G01S 5/18* | (2006.01) |
| *G06F 40/289* | (2020.01) |
| *G10L 15/22* | (2006.01) |
| *G10L 15/20* | (2006.01) |
| *G10L 15/26* | (2006.01) |
| *G06F 40/129* | (2020.01) |

(52) U.S. Cl.
CPC .......... *G10L 15/222* (2013.01); *G06F 40/129* (2020.01); *G10L 15/20* (2013.01); *G10L 15/26* (2013.01)

(58) Field of Classification Search
CPC .......... G10L 15/30; G10L 15/08; G06N 5/04; G01S 5/18; G06F 40/289
USPC ............................... 704/275; 706/45; 367/99
See application file for complete search history.

(56) References Cited

U.S. PATENT DOCUMENTS

| | | | |
|---|---|---|---|
| 5,475,791 | A | 12/1995 | Schalk et al. |
| 6,098,043 | A | 8/2000 | Forest et al. |
| 6,574,595 | B1 | 6/2003 | Mitchell et al. |
| 7,177,795 | B1 * | 2/2007 | Chen ..................... G06F 16/685 704/9 |
| 7,529,675 | B2 | 5/2009 | Maes |
| 8,244,528 | B2 | 8/2012 | Niemisto et al. |

(Continued)

OTHER PUBLICATIONS

PCT Search Report and Written Opinon dated Mar. 5, 2019, for PCT application No. PCT/US2018/064559, 9 pages.

*Primary Examiner* — Farzad Kazeminezhad
(74) *Attorney, Agent, or Firm* — Lee & Hayes, P.C.

(57) ABSTRACT

Systems and methods are provided for improving audio processing by receiving an external input sound message during playing a first audio message; matching the external input sound message with a receiving message to obtain a matching result, wherein the receiving message is associated with the first audio message in content, wherein the matching is based on a proportion of sound units in the sound message that hit sound units in the receiving message; determining whether the matching result meets a threshold; and upon determining that the matching result meets the threshold, stop playing the first audio message.

20 Claims, 14 Drawing Sheets

(56) References Cited

U.S. PATENT DOCUMENTS

| | | |
|---|---|---|
| 8,386,264 B2 | 2/2013 | Hori et al. |
| 8,521,539 B1 * | 8/2013 | Teng .................. G10L 15/30 704/275 |
| 8,538,749 B2 | 9/2013 | Visser et al. |
| 9,185,062 B1 | 11/2015 | Yang et al. |
| 9,368,114 B2 | 6/2016 | Larson et al. |
| 9,462,115 B2 | 10/2016 | Rand |
| 9,495,970 B2 | 11/2016 | Dickins et al. |
| 9,875,081 B2 | 1/2018 | Meyers et al. |
| 10,109,275 B2 * | 10/2018 | Henry ................ G06F 40/289 |
| 2003/0083874 A1 | 5/2003 | Crane et al. |
| 2005/0027527 A1 | 2/2005 | Junkawitsch et al. |
| 2007/0136222 A1 * | 6/2007 | Horvitz ................ G06N 5/04 706/45 |
| 2014/0269193 A1 * | 9/2014 | Junkar .................. G01S 5/18 367/99 |
| 2019/0096398 A1 * | 3/2019 | Sereshki ............... G10L 15/08 |

* cited by examiner

400

402

1. ZHONGGUANCUN　　　　　　　　　　　　　　　　14.4 KM
HAIDIA DISTRICT

2. ZHONGGUANCUN (SUBWAY STATION)　　　　　　 14.6 KM
LINE NO. 4/DAXING LINE

3. ZHONGGUANCUN (BUS STATION)　　　　　　　　　13.5 KM
ZHONGGUANCUN LINE OF AIRPORT BUS (LINE NO. 5)

4. ZHONGGUANCUN　　　　　　　　　　　　　　　　14.8 KM
IN THE MIDDLE OF THE NORTHWEST FOURTH RING ROAD AND
NORTHWEST THIRD RING ROAD

5. ZHONGGUANCUN SCIENCE AND TECHNOLOGY PARK　 9.3 KM
NO. 11 ANXIANG NORTH COMMUNITY

TO SELECT PLEASE SAY "WHICH ONE"
TO TURN THE PAGE PLEASE SAY "NEXT PAGE"

FIG. 4

METHOD, APPARATUS, AND TERMINAL DEVICE FOR AUDIO PROCESSING BASED ON A MATCHING OF A PROPORTION OF SOUND UNITS IN AN INPUT MESSAGE WITH CORRESPONDING SOUND UNITS IN A DATABASE

CROSS REFERENCE TO RELATED PATENT APPLICATIONS

This application claims priority to Chinese Patent Application No. 201711296558.9, filed on Dec. 8, 2017, entitled "method, apparatus, and terminal device for audio processing" which are hereby incorporated by reference in their entirety.

TECHNICAL FIELD

The present disclosure relates to the field of data processing, and in particular, to a method, apparatus, and terminal device for audio processing.

BACKGROUND

A speech dialogue system provides a natural and convenient way of interaction for human-computer interaction. A typical human-machine dialog system can understand and respond to speech from users. During the normal speech interaction, the system will communicate with the user in the form of speech broadcast, such as prompting the user how to proceed to the next step, which options are available, and so on.

The message broadcast by speech is necessary for the new user. However, if the user is familiar with the system, the user may already know the content to be broadcast or what kind of operation should be performed, and the user may wish to inform the system to end the broadcast of the prompt tone through Speech interruption (Barge-In, or called Speech Insertion), thereby improving the efficiency of interaction. That is, during the speech interaction, the speech is forcibly inserted to interrupt the broadcast speech of the system.

When the system plays the prompt tone, if there is a speech interruption event, the microphone will receive the prompt tone broadcasted by the system, and the user speech, and sometimes the environmental noise, at the same time. To detect whether the user has currently issued a speech, the data collected by the microphone needs to be echo-removed in combination with the original data of the prompt tone. In the existing speech dialogue system, the speech interruption module 100 includes components shown in FIG. 1.

The internal signal 102 is the original sound data sent to the hardware sound sensor. The external signal 104 is the data collected by the microphone, including the prompt tone, the user speech, and the surrounding environmental noise. The echo cancellation module 106 utilizes AEC (automatic echo cancellation) algorithm to perform echo cancellation on the external signal, which is then sent to the speech interruption determination module. The speech interruption determination module 108 usually adopts voice activity detection (VAD) or active speech recognition (ASR) technology to detect speech interruption events.

The work procedure 200 of the speech interruption module is shown in FIG. 2. At block 202, the system broadcasts a prompt tone. At block 204, the speech interruption event detection is performed. If a speech interruption event is detected or the prompt tone is completed, the broadcast is ended at block 206, otherwise, the broadcast is continued, and the process 200 returns to block 202.

The above speech interruption techniques have some shortcomings, such as the followings.

1. The AEC algorithm used for echo cancellation cannot completely eliminate the prompt tone, and there may be prompt tone remaining in the final output signal.

2. The accuracy of the speech activity detection is not high enough, especially under the interference of the environmental noise, it is easy to mistake other non-speech sound for speech and thus cause false detection of the speech interruption event.

3. The speech recognition module may have false recognition that causes false detection of the speech interruption event.

4. Unrelated sounds (such as coughing, talking to other people, etc.) from the user may cause a speech interruption event.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above problems, example embodiments of the present disclosure provide a method, an apparatus, and a terminal device for audio processing to solve the problems existing in the conventional techniques.

In order to solve the above problem, an example embodiment of the present disclosure discloses an audio processing method, including the following.

An external input sound message is received during playing the first audio message.

The sound message is matched with a receiving message, wherein the receiving message is associated with the first audio message in content.

In case of determining that the matching result satisfies the threshold, the playing of the first audio message is stopped.

An example embodiment of the present invention further discloses an audio processing method for an in-vehicle terminal, which includes the following.

A sound message collected is received from the interior environment during playing the first audio message.

The sound message is matched with a receiving message, wherein the receiving message is associated with the first audio message in content.

In case of determining that the matching result satisfies the threshold, the playing of the first audio message by the in-vehicle terminal is stopped.

An example embodiment of the present disclosure discloses an audio processing method for a mobile client, which includes the following.

A sound message collected is received from a sound collection device of the mobile client during playing the first audio message.

The sound message is matched with a receiving message, wherein the receiving message is associated with the first audio message in content.

In case of determining that the matching result satisfies a threshold, the playing of the first audio message by the mobile client is stopped.

An example embodiment of the present invention discloses an audio processing method for a smart device, which includes the following.

A sound message collected is received from a sound collection device of the smart device during playing the first audio message.

The sound message is matched with a receiving message, wherein the receiving message is associated with the first audio message in content.

In case of determining that the matching result satisfies a threshold, the playing of the first audio message by the smart device is stopped.

An example embodiment of the present disclosure discloses an audio processing device, which includes the following A receiving module is configured to receive an external input sound message during playing the first audio message.

A matching module is configured to match the sound message with a receiving message, where the receiving message is associated with the first audio message in content.

An interrupting module is configured to stop playing the first audio message when determining that the matching result meets a threshold.

An example embodiment of the present disclosure further discloses a terminal device, which includes the following.

One or more processors; and

One or more machine-readable media, stored thereon instructions that, when executed by the one or more processors, cause the terminal device to perform the methods described above.

An example embodiment of the present disclosure also discloses one or more machine-readable media, stored thereon instructions that, when executed by one or more processors, cause the terminal device to perform the methods described above.

An example embodiment of the present disclosure also discloses an intelligent vehicle, including the terminal device described above.

An example embodiment of the present disclosure further discloses an audio processing method, which includes the following.

An external input sound message is received during playing the first audio message.

It is determined that the sound message is associated with the first audio message in content.

The playing the first audio message is stopped.

In view of the above, the example embodiments of the present disclosure include the following advantages.

The audio processing method provided by the present invention may set a receiving message for the first audio message in advance, compare the received sound message with the receiving message, and stop playing the current first audio message when the sound message matches one of the receiving messages. Because of the presence of the receiving message, the audio processing method provided by the present invention may recognize the sound message sent by the user more quickly and accurately, and perform a voice interrupting operation according to the sound message, thereby improving the accuracy and efficiency of the recognition.

BRIEF DESCRIPTION OF THE DRAWINGS

In order to illustrate the example embodiments of the present disclosure or the technical solutions in the conventional techniques more clearly, the drawings used in the description of the example embodiments or the conventional techniques will be briefly introduced below. Apparently, the drawings in the following description are some of the example embodiments of the present disclosure, and other drawings may be obtained from these drawings by those skilled in the art without any creative work.

FIG. 4 is a schematic diagram of an interface of an executive subject of the audio processing method according to the first example embodiment of the present disclosure.

DETAILED DESCRIPTION

The technical solutions in the example embodiments of the present disclosure will be clearly and completely described below with reference to the drawings in the example embodiments of the present disclosure. The described example embodiments merely represent only a part of the example embodiments of the present disclosure. All other example embodiments obtained by those skilled in the art based on the example embodiments of the present disclosure are within the scope of the present disclosure.

The present disclosure provides an audio processing method and an instruction processing method, in which if an executive subject receives a sound message sent by a user when playing the first audio message, such as prompt message, the sound message is compared with the receiving message, when it is confirmed that the sound message can match with the receiving message, it is determined that the sound message is a speech interruption instruction, and then the playing the first audio message is stopped, thereby realizing the speech interruption.

First Example Embodiment

Figure 1:
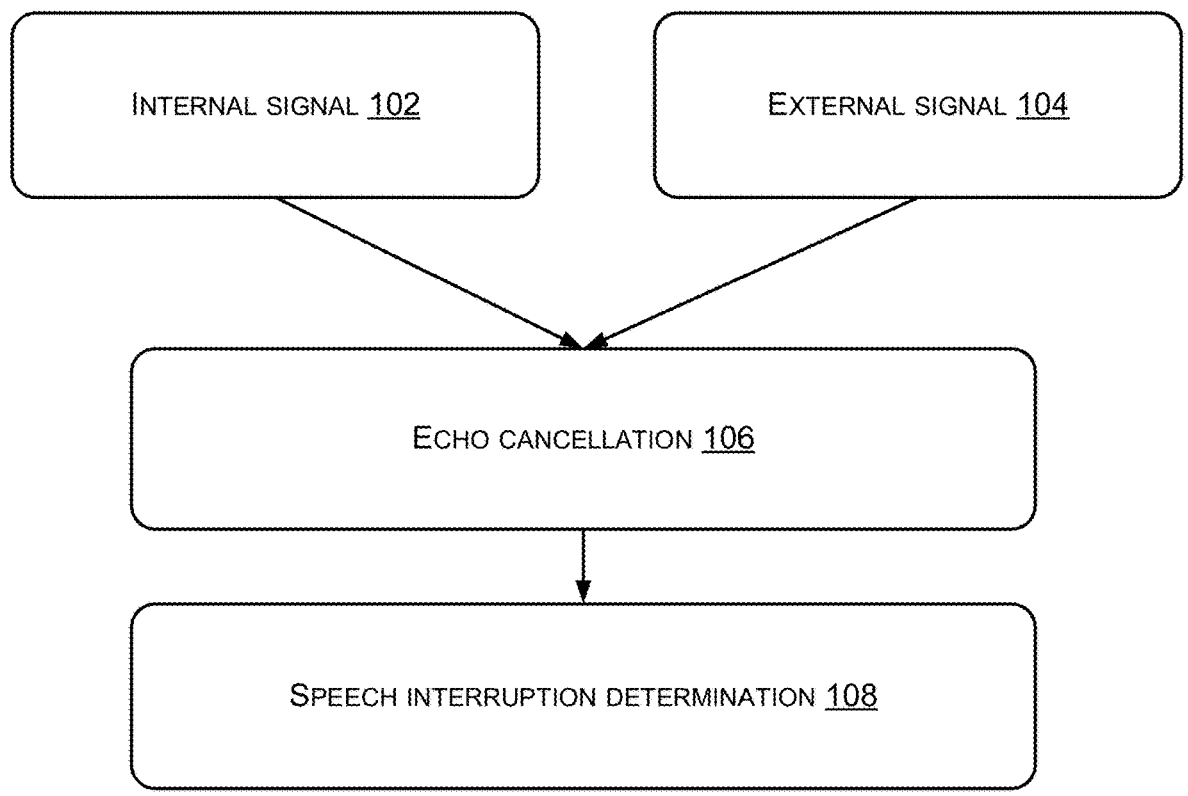
FIG. 1 is a schematic diagram of a speech interruption module in the conventional techniques.
Figure 2:
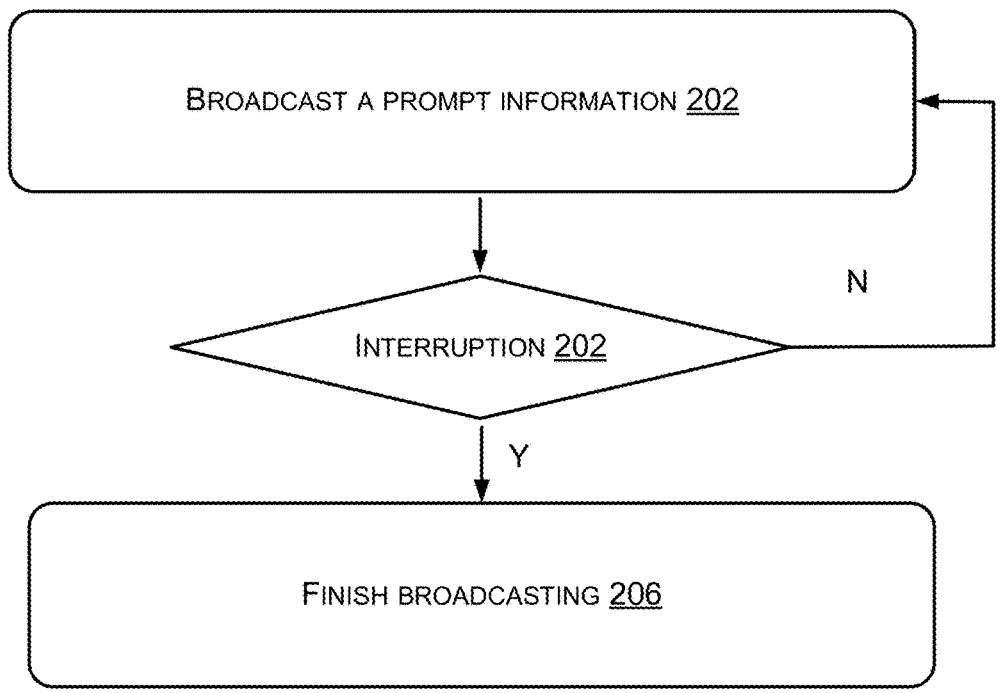
FIG. 2 is a flowchart of the speech interruption module in the conventional techniques.
Figure 3:
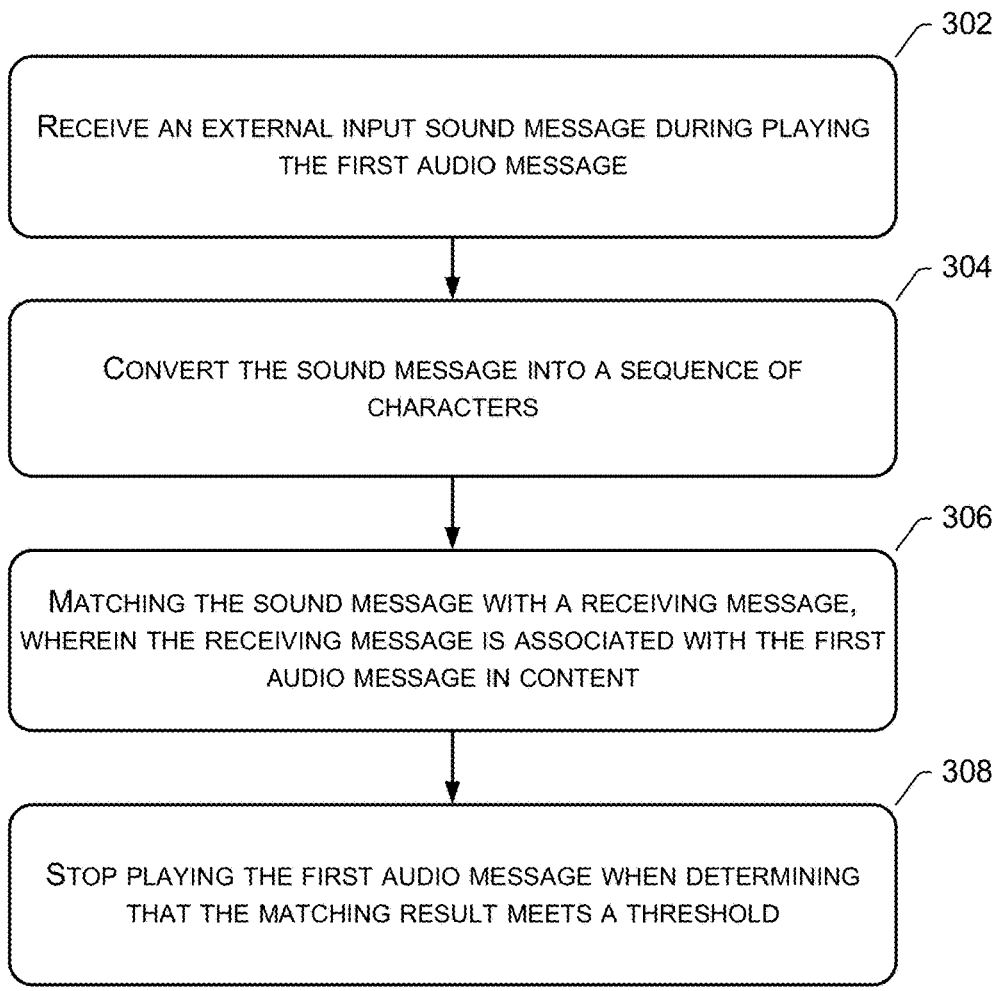
FIG. 3 is a flowchart of an audio processing method according to a first example embodiment of the present disclosure.

The first example embodiment of the present disclosure proposes an audio processing method. FIG. 3 is a flowchart showing the steps of the audio processing method 300 according to the first example embodiment of the present disclosure. FIG. 4 is a schematic diagram of an interface 400 of an executive subject of an audio processing method according to a first example embodiment of the present disclosure. As shown in FIG. 3 and FIG. 4, the audio processing method according to the example embodiment of the present disclosure includes the following steps.

At 302, an external input sound message is received during playing the first audio message.

In this step, the executive subject, such as an in-vehicle terminal, a mobile phone, a server, a smart household item, and other electronic devices that have various computing and processing functions, may receive an external input sound message. Taking the example that the executive subject is an in-vehicle terminal, an operating system and an application program may be installed on the in-vehicle terminal. The user opens the application on the interface of the in-vehicle terminal and performs a human-machine interactive dialogue with the in-vehicle terminal through the speech operation function provided by the application. When the in-vehicle terminal plays the first audio message, for example, a prompt message for reminding the user to make a choice, the user uses a speech to give a processing instruction, for example, to confirm an option, select one of the options, exit, return to main interface, and the like. The executive subject may receive the external input sound message through a sound collecting device, such as a microphone, to obtain a speech instruction of the user.

At 306, the sound message is matched with a receiving message, wherein the receiving message is associated with the first audio message in content.

In this step, taking the example that the executive subject is an in-vehicle terminal, the in-vehicle terminal may search for the receiving message matching the sound message in a storage area or the associated remote database, that is, to match the sound message with the receiving message. The above "receiving message matching the sound message" may be a matched audio message, or a matched text message, or the like.

The receiving message may be associated with the first audio message in content. For example, the first audio message that is currently played is a picklist, which may be the result of the dialogue of the previous round of human-computer interaction. If the user of the previous round says "navigate to Zhongguancun", the in-vehicle terminal may show the picklist 402 as shown in FIG. 4. The picklist broadcast by speech is that "X results for Zhongguancun has been found for you, which one would you like to choose". Correspondingly, the receiving message may be a sound message about "which one", a corresponding textual content, and the like.

In this example embodiment, at the bottom of the picklist, the user is indicated to "to select an option please say 'which one', to turn the page please say 'next page'". In actual use, however, the user may not necessarily follow the prompt message. Therefore, the receiving message may include other contents with which the user is or may be associated, such as confirm, return, return to main menu, exit, and the like.

For example, after receiving the sound message, the in-vehicle terminal may recognize the sound message as a text message. The receiving message corresponding to the first audio message may be textual content corresponding to the option of the prompt message, and general options, such as, agree, yes, choose 1, confirm, return, disagree, etc., in addition to various options. After receiving the sound message, the in-vehicle terminal may recognize the sound message as a text message, compare it with the textual content corresponding to the option to determine whether the sound message matches the receiving message.

For another example, the receiving message corresponding to the first audio message may be an audio message, such as the audio message of textual content corresponding to the option of the prompt message, and general options, such as, agree, yes, choose 1, confirm, return, disagree, etc., in addition to various options. After receiving the sound message, the in-vehicle terminal may compare the sound message with the audio message to determine whether the sound message matches the receiving message.

The receiving message corresponding to the first audio message may be pre-stored in the database or may be obtained by performing instant processing on the first audio message, and the present disclosure is not limited thereto. For example, when the text comparison mode is adopted, that is, when the receiving message is textual content, in the operation, the textual content corresponding to the first audio message may be obtained instantly as the receiving message. when the audio comparison mode is adopted, that is, when the received message is an audio message, in the operation, the content of the first audio message may be converted into audio as the receiving message by using a background conversion program.

At 308, the playing the first audio message is stopped when determining that the matching result meets a threshold.

In this step, when it is judged that the degree that the sound message matches the receiving message meets the threshold, it is determined that the sound message is a speech interruption instruction, and the playing the first audio message may be stopped according to the instruction.

For example, when the in-vehicle terminal shows the picklist, the sound message sent by the user is received and it is determined in the background program of the in-vehicle terminal that the sound message matches the receiving message. Then it is deemed that the user has given the next instruction, and it is needless to continue playing the first audio message. In this step, the speech interruption processing may be performed, and the playing the first audio message is stopped.

For example, the above-mentioned situation where "the matching result meets a threshold" is that the proportion of sound units in the sound message that hit sound units in the receiving message is larger than the threshold. For example, when a certain item in the receiving message is "Zhong-Guan-Cun-Da-Jie (Zhongguancun Street)", which includes the sound units of "zhong", "guan", "cun", "da", and "jie". At the same time, the obtained sound message includes the sound units of "zhong", "guan", "cun", and "da", and the proportion threshold is 75%. At this time, the number of matched items hit by the sound message is 80%, and it is deemed that the percentage threshold is met.

The above sound unit is described in units of characters. However, in actual use, the sound message may be decomposed in units of syllables, phonemes, various phonetic characters, etc., all of which belong to the protective scope of the present disclosure and are not described herein again.

In an example embodiment of the present disclosure, after the step 302, the above method further includes the following step.

At 304, the sound message is converted into a sequence of characters.

The receiving message includes a sequence of characters corresponding to at least one option in the first audio message.

In this step, after the sound message is received, the sound message may be converted into a sequence of characters, such as a sequence of phonetic character. If the user says "Di-Yi-Ge (the first one)", in the executive subject, the sound message may be converted into a sequence of Chinese phonetic characters, for example, "di yi ge" or "di4 yi1 ge4" containing tones. In this case, the receiving message may be set as a sequence of Chinese phonetic characters corresponding to the option of the first audio message. The option provided by the first audio message may be converted into a sequence of Chinese phonetic characters in the manner of instant conversion or advance conversion.

Similarly, the sequence of characters may also be a sequence of texts, or a sequence of characters in other non-Chinese languages, such as a sequence of phonetic characters in English, Japanese, Korean, and so on. Taking English as an example, when the sound message sent by the user is "one", in the executive subject, the sound message may be converted into a sequence of English characters, for example, "[wʌm]" indicated by phonetic symbols. In this case, the receiving message may be set as a sequence of English characters corresponding to the option of the first audio message. The option provided by the first audio message may be converted to a sequence of English characters in the manner of instant conversion or advance conversion.

In an optional example embodiment of the present disclosure, after the step 306, the method provided in the example embodiment of the present disclosure may further include the following step.

At 308a, if the matching result does not satisfy the threshold, the playing the first audio message continues.

In this step, for example, if the proportion of the sound units in the sound message that hit the sound units in the receiving message is less than the threshold, then it is deemed that the threshold is not met, and the executive subject does not perform the interrupting operation and keeps playing the first audio message.

In view of the above, the audio processing method proposed by the first example embodiment of the present disclosure has at least the following technical effects:

The audio processing method provided by the present disclosure may set a receiving message for the first audio message in advance, compare the received sound message with the receiving message, and stop playing the first audio message when the sound message matches one of the receiving messages. Due to the existence of the receiving message, the audio processing method provided by the present disclosure may recognize the sound message sent by the user more quickly and accurately and perform a speech interruption operation according to the sound message, thereby improving the accuracy and efficiency of the recognition.

Second Example Embodiment

Figure 5:
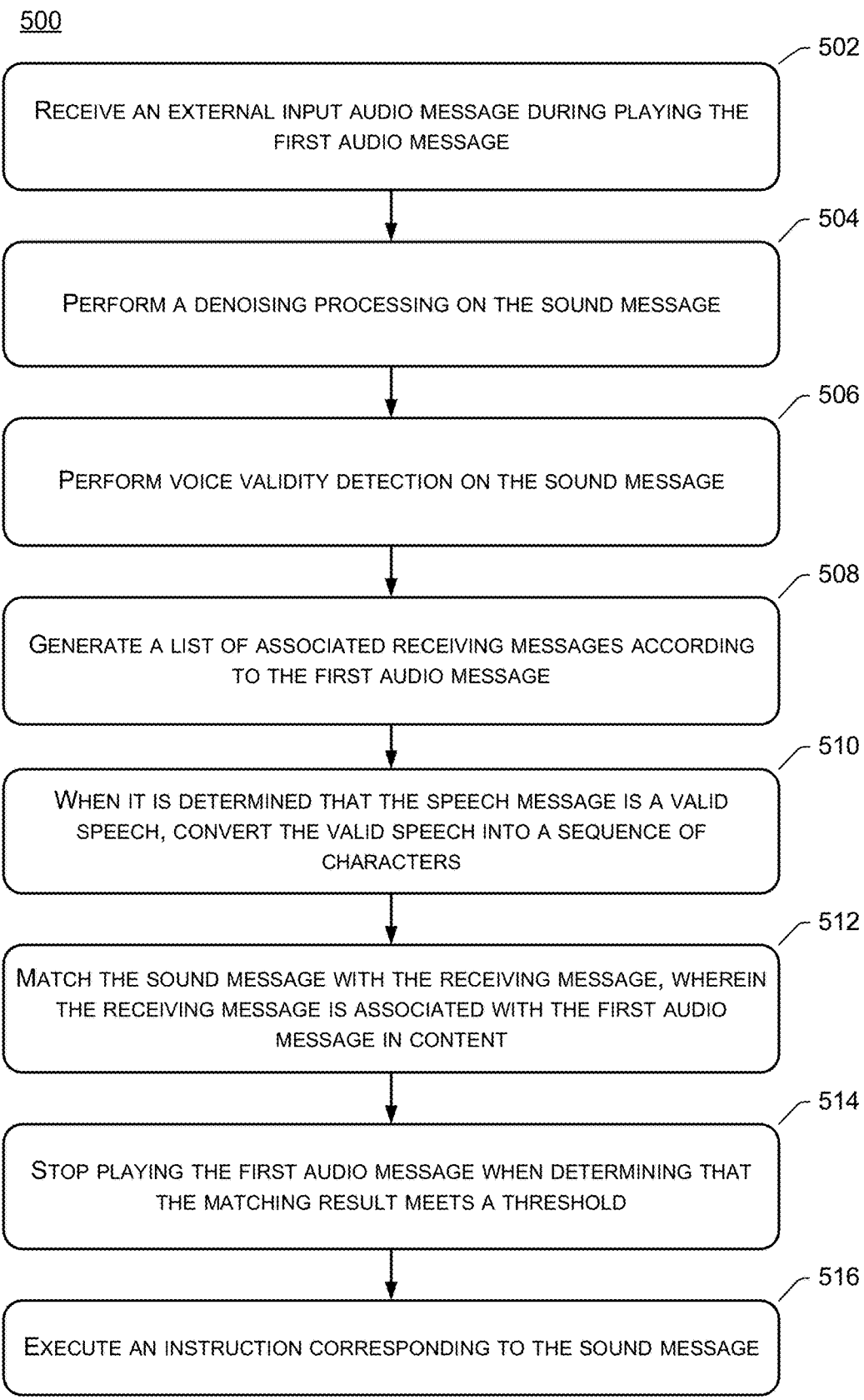
FIG. 5 is a flowchart of an audio processing method according to a second example embodiment of the present disclosure.

The second example embodiment of the present disclosure provides an audio processing method. FIG. 5 is a flowchart showing the steps of an audio processing method 500 according to a second example embodiment of the present disclosure. As shown in FIG. 5, the audio processing method of the example embodiment of the present disclosure is as follows.

At 502, an external input audio message is received during playing the first audio message.

At 512, the sound message is matched with the receiving message, wherein the receiving message is associated with the first audio message in content.

At 514, the playing the first audio message is stopped when determining that the matching result meets a threshold.

The above steps are the same as or similar to the steps 302, 306, and 308 of the first example embodiment, and are not described herein again.

In an optional example embodiment of the present disclosure, after the step 502 of receiving the external input sound message during playing the first audio message, the method further includes the following step.

At 504, a denoising processing is performed on the sound message.

In use, the in-vehicle terminal plays the first audio message, for example, to remind the user to make a choice from the list displayed on the interface and the like. The audio signal of the first audio message is output from the playing channel through a sound amplifying device (such as a speaker). Generally, this audio signal is referred to as an internal signal which is used with an external signal (the above-described sound message) received by the microphone for echo cancellation. Generally, the sound message collected by the microphone array includes the above played first audio message, the environmental noise, and the user speech instruction. When the first audio message is played through a headphone or the like, the sound message collected by the microphone array may also include the environmental noise and the user's speech instruction. Therefore, the echo cancellation may be performed on the sound message received by the microphone by using the automatic noise cancellation algorithm, so that the finally output speech is interfered by the prompt tone as little as possible.

In an optional example embodiment of the present disclosure, after the step 502 of receiving the external input sound message during playing the first audio message, the method further includes the following step.

At 506, voice validity detection is performed on the sound message.

In this step, the existing voice activity detection (VAD) technology may be used to detect whether the sound message is a valid speech in order to avoid coughing, low voice, environmental noise, etc., from being recognized as a speech, causing a false interruption event. In this step, the speech and non-speech may be judged based on the energy, for example, the speech threshold may be set, and the message higher than the threshold is detected as the speech. Alternatively, the model may be used for classification, and the speech judgment model may be set on the executive subject or the server. After the sound message is received, the model is input and whether the sound message is a valid speech is determined. After it is determined that the sound message is a valid speech, subsequent processing is performed. The sound message is ignored when it is judged that the sound is not a valid speech.

In an optional example embodiment of the present disclosure, the receiving message may be generated and stored in the storage area in advance or may be generated instantly. In the case that the receiving message is generated instantly, before the step 512 of determining whether there is a receiving message that matches the sound message, the method further includes the following step.

At 508, a list of associated receiving messages is generated according to the first audio message.

This step may be performed during playing the first audio message, before, after or simultaneously with the receiving of the external input sound message. In one case, as long as the first audio message is determined, it may be determined that the message to be received next by the executive subject, such as the in-vehicle terminal, is associated with the first audio message. Therefore, the receiving message associated with the first audio message may be generated.

For example, the first audio message that is currently played is a picklist, which may be the result of the dialogue of the previous round of human-computer interaction. If the user of the previous round says "navigate to Zhongguancun", the in-vehicle terminal may show the picklist. The picklist broadcast by speech is that "X results for Zhongguancun has been found for you, which one would you like to choose". Correspondingly, the receiving message may be a sound message about "which one", a corresponding textual content, or the like, or other associated content such as confirm, return, return to main menu, exit, and other instructions. In this step, the associated receiving message may be generated according to the picklist. For example, each option in the picklist may be converted into a Chinese phonetic sequence, and other general content such as Chinese phonetic sequence corresponding to confirm, return, return to main menu, exit, and so on, may be set for subsequent matching.

In an example embodiment of the present disclosure, after the step 506 or the step 508, the method may further include the following step.

At 510, when it is determined that the sound message is a valid speech, the valid speech is converted into a sequence of characters.

The receiving message includes a sequence of characters corresponding to at least one option in the first audio message.

In this step, after a valid speech is received, the sound message may be converted into a sequence of characters, such as a sequence of phonetic characters. If the user says "Di-Yi-Ge (the first one)", then in the background of the in-vehicle terminal, the sound message may be converted into a sequence of Chinese phonetic characters, for example, "di yi ge" or "di4 yi1 ge4" containing tones. In this case, the receiving message may be set as a sequence of Chinese phonetic characters corresponding to the option of the first audio message. The option provided by the first audio message may be converted into a sequence of Chinese phonetic characters in the manner of instant conversion or advance conversion.

Similarly, the sequence of characters may also be a sequence of characters in other non-Chinese languages, such as a sequence of phonetic characters in Japanese, Korean, and so on, which will not be described herein.

In an optional example embodiment, the method may further include a step 516 in which an instruction corresponding to the sound message is executed.

In this step, the executive subject executes an instruction corresponding to the sound message. For example, if the sound message is recognized as "the first option", then it matches, and the corresponding receiving message (for example, the first option in the picklist) is executed. Alternatively, if the sound message is recognized as "select 1", or "one", or the like, similarly, the first option in the picklist is executed. In addition, when the sound message is recognized as "yes", the currently played option in the picklist may be executed.

In summary, the audio processing method proposed in this example embodiment has at least the following advantages.

The audio processing method provided by the present disclosure may set a receiving message for the first audio message, compare the received sound message with the receiving message, and stop playing the current first audio message when the sound message matches one of the receiving messages. Due to the existence of the receiving message, the audio processing method provided by the present disclosure may recognize the sound message sent by the user more quickly and accurately and perform a speech interruption operation according to the sound message, thereby improving the accuracy and efficiency of the recognition.

In addition, the audio processing method proposed in this example embodiment further includes at least the following advantages.

The audio processing method proposed by the present disclosure does not completely rely on the processing result of the existing echo cancellation technology and may allow a certain tone residual in the echo cancellation algorithm. In addition, the audio processing method provided by the example embodiment of the present disclosure does not completely rely on the voice activity detection technology for speech interruption determination. It combines the sound message sent by the user and the receiving message to make the determination more accurate and is more stable against the interference of the environmental noise and highly robust. Furthermore, the audio processing method provided by the example embodiment of the present disclosure does not respond to the speech unrelated to the first sound message and an interruption event is determined only when the speech content spoken by the user is related to the current conversation scene. Therefore, it can effectively avoid the noise interference of the surrounding environment, avoid the occurrence of accidental interruption, and save the calculation processing resources.

Third Example Embodiment

Figure 6:
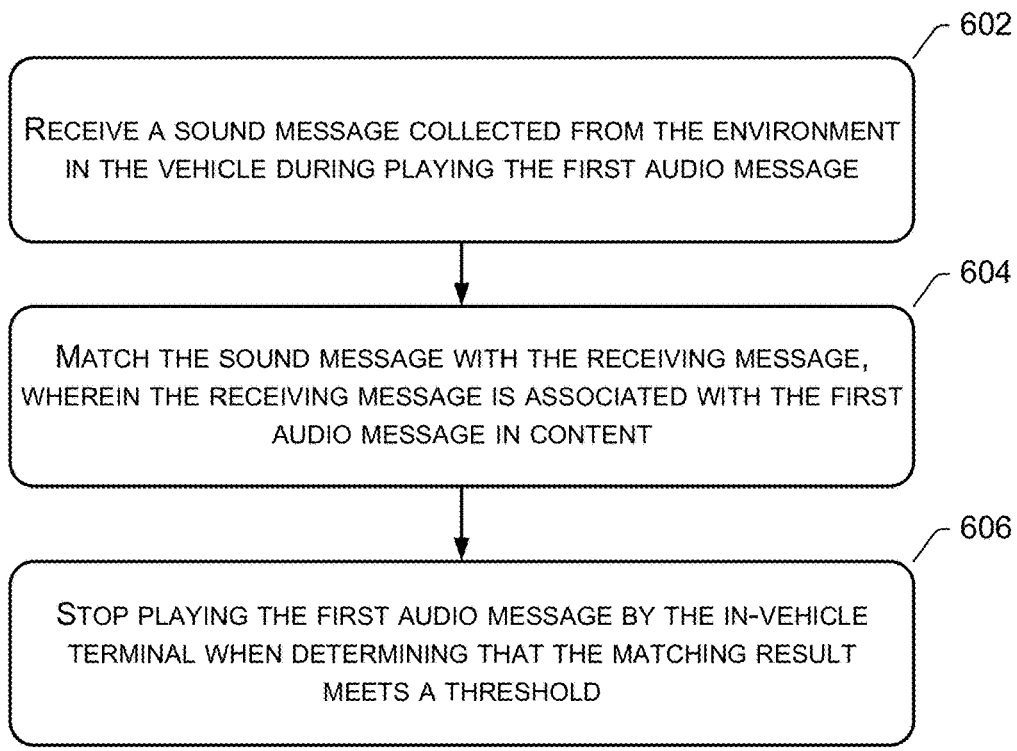
FIG. 6 is a flowchart of an audio processing method of an in-vehicle terminal according to a third example embodiment of the present disclosure.
Figure 7:
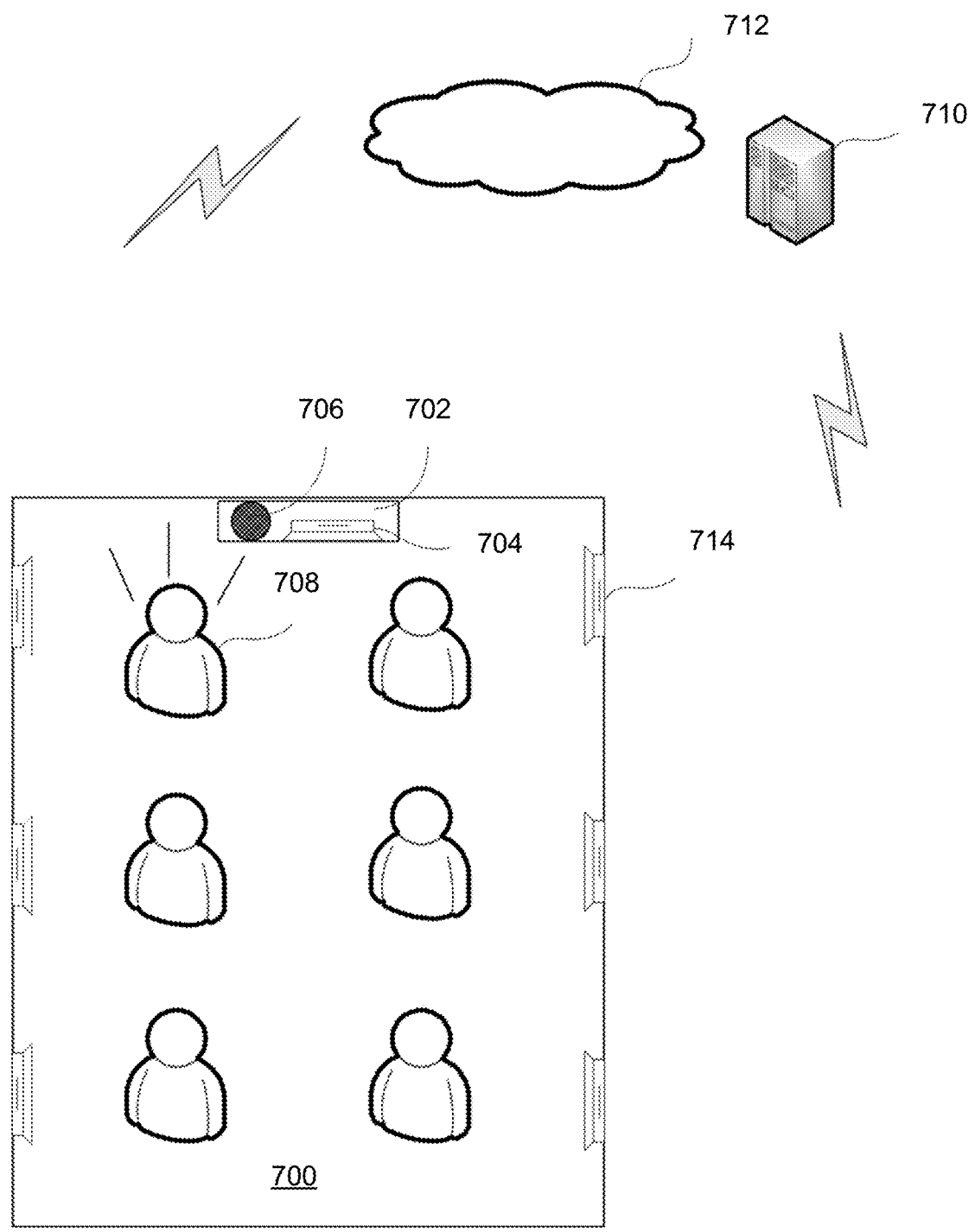
FIG. 7 is a schematic diagram of an in-vehicle terminal and a vehicle environment.

The third example embodiment of the present disclosure provides an audio processing method for an in-vehicle terminal. FIG. 6 is a flowchart of an audio processing method 600 of the in-vehicle terminal of the third example embodiment of the present disclosure, and FIG. 7 is a schematic diagram of an in-vehicle environment including the in-vehicle terminal 702. As shown in FIG. 7, the vehicle 700 includes an in-vehicle terminal 702 disposed inside the vehicle. The in-vehicle terminal 702 includes a speaker 704 and a microphone 706, and may further include a screen, a button, and the like (not shown). In addition to being integrated into the in-vehicle terminal, the speaker 714 may also be disposed at other locations inside the vehicle for the user 708 to listen to messages. The in-vehicle terminal 702 has a computing and processing function that may be installed thereon an operating system and an application and may also remotely network with the server 710 via the Internet 712 for data interaction.

In combination with FIG. 6 and FIG. 7, the method includes the following steps.

At 602, a sound message collected from the environment in the vehicle is received during playing the first audio message.

In this step, similarly to step 302 of the first example embodiment, the in-vehicle terminal 702 may receive the sound message of the environment in the vehicle. For example, when the in-vehicle terminal plays the first audio message to remind the user 708 to make a choice, during the playing process, the user gives a processing instruction by using a speech, for example, to perform operations such as confirming an option, selecting one of the options, exiting, returning to the main interface, and so on. The executive subject may receive the sound message of the environment in the vehicle through a sound collecting device such as the microphone 706 and the like and obtain a speech instruction of the user 708.

At 604, the sound message is matched with the receiving message, wherein the receiving message is associated with the first audio message in content.

In this step, similarly to step 306 of the first example embodiment, the in-vehicle terminal 702 may look up in the storage area or database whether or not there is a receiving message matching the sound message. The above "receiving message matching the sound message" may be a matched speech message, or a matched text message, or the like. The storage area may be a memory provided by the in-vehicle terminal itself or a storage area of the server 710 and is not limited herein.

At 606, the playing the first audio message by the in-vehicle terminal is stopped when determining that the matching result meets a threshold.

In this step, similarly to step 308 of the first example embodiment, when the in-vehicle terminal 702 plays the picklist, the sound message sent by the user 708 is received, and if it is determined in the background program of the in-vehicle terminal 702 that the sound message matches the receiving message, then it is deemed that the user has given the next instruction and there is no need to continue playing the first audio message. In this step, the speech interruption processing may be performed to stop playing the first audio message.

In an optional example embodiment, the method further includes a step S404, where the instruction corresponding to the sound message is executed by the in-vehicle terminal.

In step S404, an instruction corresponding to the sound message is executed by the in-vehicle terminal. For example, if the sound message is recognized as "the first option", then it matches, and the corresponding receiving message (for example, the first option in the picklist) is executed. Alternatively, if the sound message is recognized as "select 1", similarly, the first option in the picklist is executed. In addition, when the sound message is recognized as "yes", the in-vehicle terminal may execute the currently played option in the picklist.

The audio processing method of the in-vehicle terminal provided by the present disclosure may set a receiving message for the first audio message, compare the received sound message with the receiving message, and stop playing the current first audio message when the sound message matches one of the receiving messages. Due to the existence of the receiving message, the audio processing method of the in-vehicle terminal provided by the present disclosure may recognize the sound message sent by the user in the vehicle more quickly and accurately and perform a speech interruption operation according to the sound message, thereby improving the accuracy and efficiency of the recognition.

Fourth Example Embodiment

Figure 8:
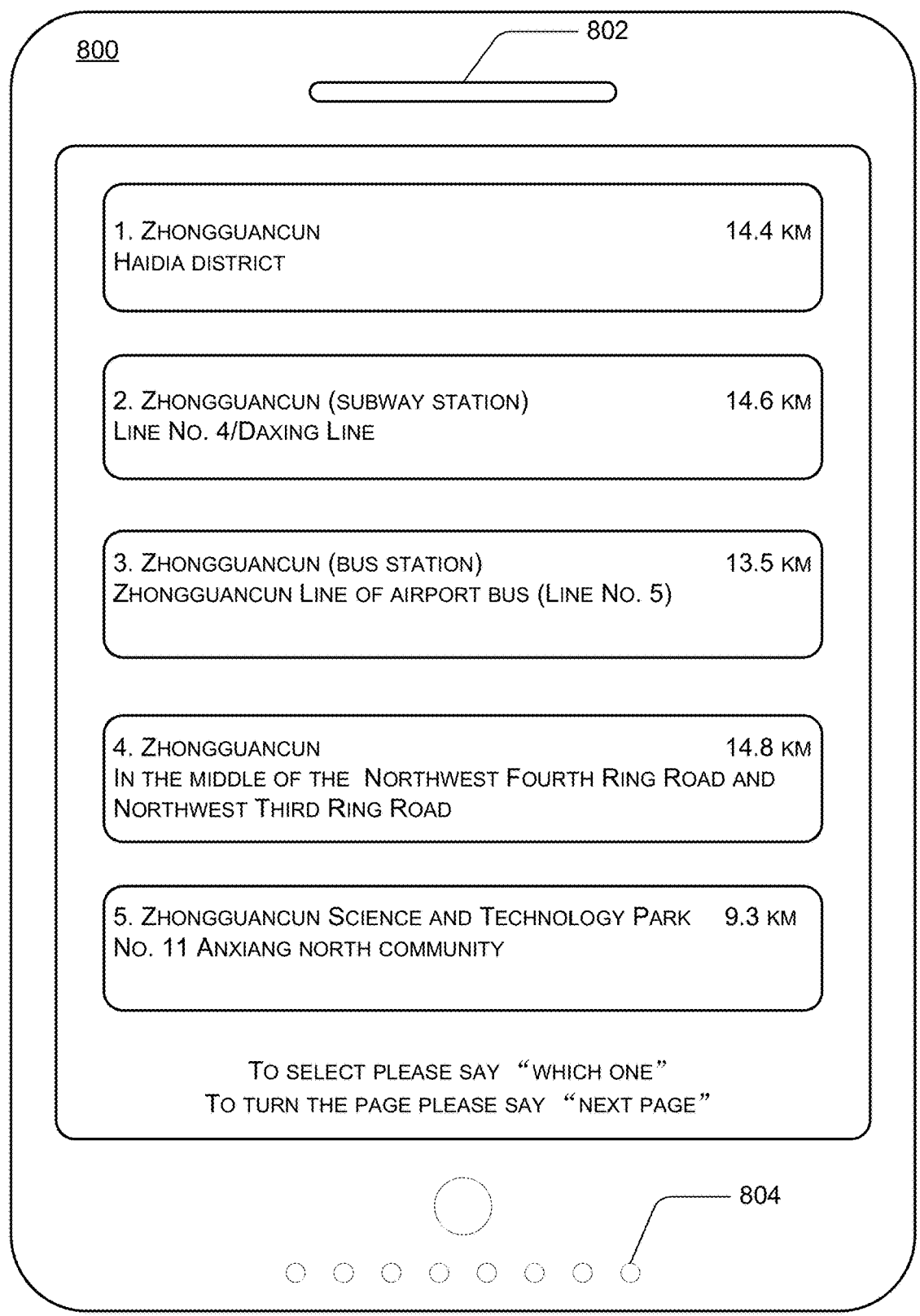
FIG. 8 is a schematic diagram of an interface of the mobile client.
Figure 9:
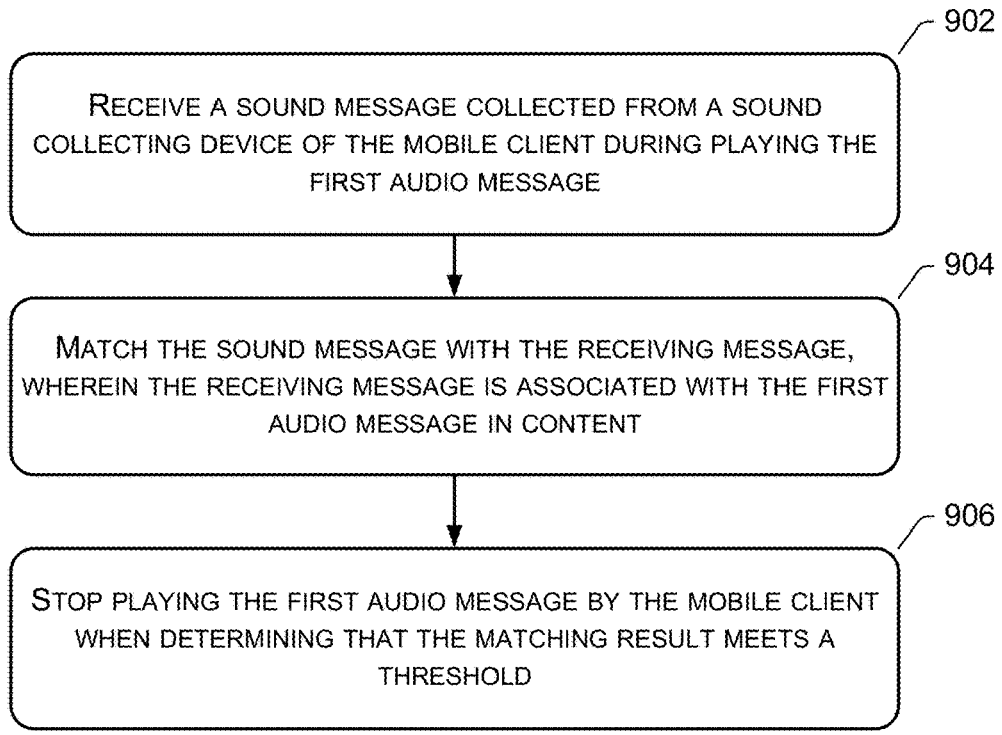
FIG. 9 is a flowchart of an audio processing method of a mobile client.

The fourth example embodiment of the present disclosure provides an audio processing method for a mobile client. FIG. 9 is a flowchart of an audio processing method 900 for a mobile client, and FIG. 8 is a schematic diagram of an interface 800 of a mobile client. As shown in FIG. 8 and FIG. 9, the method may include the following steps.

At 902, a sound message collected from a sound collecting device of the mobile client is received during playing the first audio message.

In this step, similar to step 302 of the first example embodiment, the mobile client 800 may receive the sound message of the environment in the vehicle. For example, when the mobile client plays, through the earpiece 802, the first audio message, for example, the prompt message that reminds the user to make a selection, during the playing process, the user uses a speech to give a processing instruction, for example, to perform operations such as confirming an option, selecting one of the options, exiting, returning to main interface, and the like. The executive subject may receive the user's sound message through a sound collecting device, such as a microphone 804 and the like, and obtain a speech instruction of the user. While playing the first audio message, the mobile client 800 may also display the corresponding content, as shown in FIG. 9.

At 904, the sound message is matched with the receiving message, wherein the receiving message is associated with the first audio message in content.

In this step, similarly to step 306 of the first example embodiment, the mobile client 800 may look up in the storage area or the remotely associated database whether there is a receiving message matching the sound message. The above "receiving message matching the sound message" may be a matched speech message, or a matched text message, or the like. The foregoing storage area may be a memory, or the like carried by the mobile client itself and is not limited herein.

At 906, the playing the first audio message by the mobile client is stopped when determining that the matching result meets a threshold.

In this step, similarly to step 308 of the first example embodiment, when the mobile client 800 plays the picklist, the sound message sent by the user is received by the sound collecting device and if it is determined in the background program of the mobile client 800 that the sound message matches the receiving message, then it is deemed that the user has given the next instruction and there is no need to continue playing the first audio message. In this step, the speech interruption processing may be performed to stop playing the first audio message.

In summary, the audio processing device of the mobile client proposed in this example embodiment has at least the following advantages.

The audio processing device of the mobile client provided by the present disclosure may set a receiving message for the first audio message, compare the received sound message with the receiving message, and stop playing the current first audio message when the sound message matches one of the receiving messages. Due to the existence of the receiving message, the audio processing method of the smart device provided by the present disclosure may enable the mobile client to recognize the sound message sent by the user more quickly and accurately and perform a speech interruption operation according to the sound message, thereby improving the accuracy and efficiency of the recognition.

Fifth Example Embodiment

The fifth example embodiment of the present disclosure provides an audio processing device for a smart device. The above-mentioned smart device includes a smart household item, such as microwave oven, oven, washing machine, dishwasher, air conditioner, router, speaker, television, refrigerator, vacuum cleaner, and the like.

Figure 10:
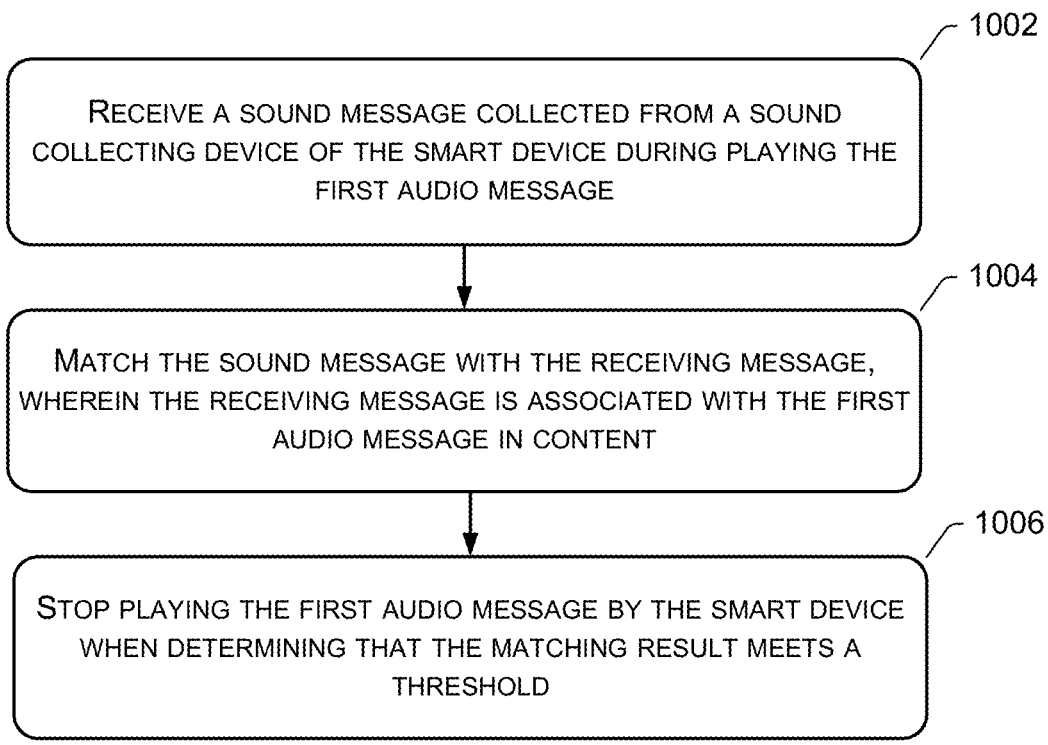
FIG. 10 is a flowchart of an audio processing method of a smart device.

FIG. 10 is a flowchart of an audio processing method of a smart device, and the method may include the following steps.

At 1002, a sound message collected from a sound collecting device of the smart device is received during playing the first audio message.

In this step, similar to the step 302 of the first example embodiment, the sound message in the use environment may be received. For example, when the smart device plays the first audio message, for example, the prompt message that reminds the user to make a selection, during the playing process, the user uses a speech to give a processing instruction, for example, to perform operations such as confirming an option, selecting one of the options, exiting, returning to the main interface, and the like. The executive subject may receive the user's sound message through a device, such as the sound collecting device, and obtain the speech instruction of the user. While playing the first audio message, the corresponding content may also be displayed on the display device of the smart device.

At 1004, the sound message is matched with the receiving message, wherein the receiving message is associated with the first audio message in content.

In this step, similarly to step 306 of the first example embodiment, the smart device may look up in the storage area or the remotely associated database whether there is receiving message matching the sound message. The above "receiving message matching the sound message" may be a matched speech message, or a matched text message, or the like. The foregoing storage area may be a memory, or the like carried by the smart device itself and is not limited herein.

At 1006, the playing the first audio message by the smart device is stopped when determining that the matching result meets a threshold.

In this step, similarly to step 308 of the first example embodiment, when the smart device plays the picklist, the sound message sent by the user is received by the sound collecting device, and if it is determined in the background program of the smart device that the sound message matches the receiving message, then it is deemed that the user has given the next instruction and there is no need to continue playing the first audio message. In this step, the speech interruption processing may be performed to stop playing the first audio message.

In summary, the audio processing device of the smart device proposed in this example embodiment has at least the following advantages.

The audio processing device of the smart device provided by the present disclosure may set a receiving message for the first audio message, compare the received sound message with the receiving message, and stop playing the current first audio message when the sound message matches one of the receiving messages. Due to the existence of the receiving message, the audio processing method of the smart device provided by the present disclosure may enable the smart device to recognize the sound message sent by the user more quickly and accurately and perform a speech interruption operation according to the sound message, thereby improving the accuracy and efficiency of the recognition.

Sixth Example Embodiment

Figure 11:
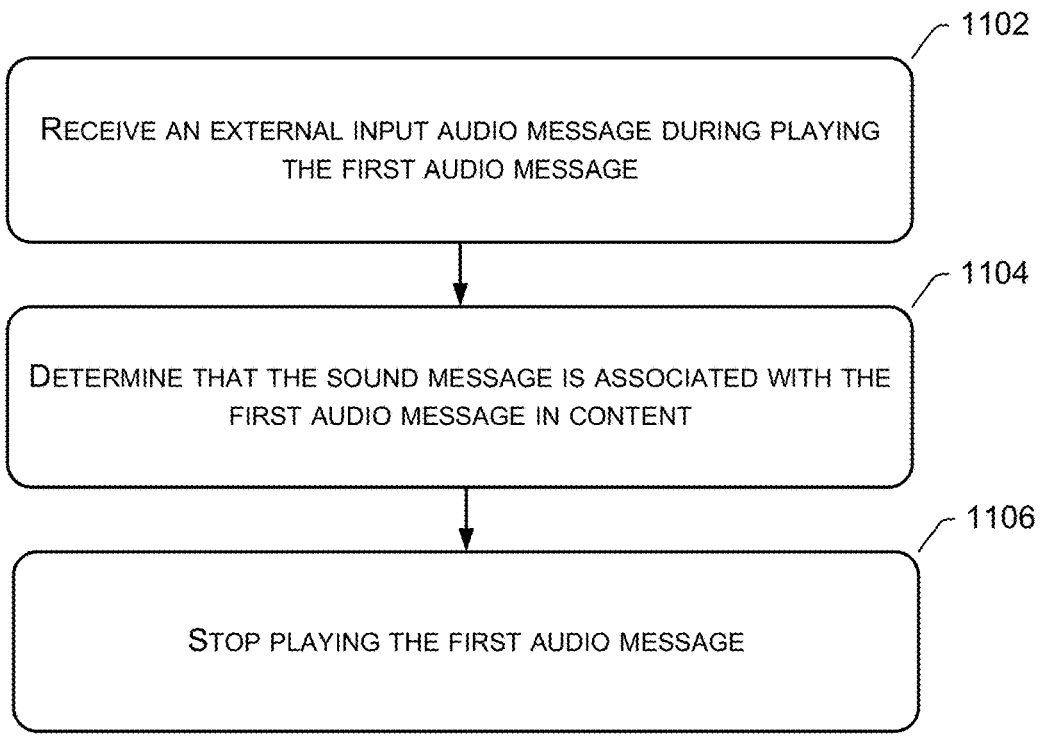
FIG. 11 is a flowchart of an audio processing method according to a sixth example embodiment of the present disclosure.

The sixth example embodiment of the present disclosure provides an audio processing method, and FIG. 11 is an example embodiment of an audio processing method according to an example embodiment of the present disclosure. As shown in FIG. 11, the method may include the following steps.

At 1102, an external input audio message is received during playing the first audio message.

In this step, the executive subject, such as an in-vehicle terminal, a mobile phone, a server, a smart household item, and other electronic devices that have various computing and processing functions, may receive an external input sound message. Taking the example that the executive subject is an in-vehicle terminal, an operating system and an application program may be installed on the in-vehicle terminal. The user opens the application on the interface of the in-vehicle terminal and performs a human-machine interactive dialogue with the in-vehicle terminal through the speech operation function provided by the application. When the in-vehicle terminal plays the first audio message, for example, a prompt message for reminding the user to make a choice, the user uses a speech to give a processing instruction, for example, to confirm an option, select one of the options, exit, return to main interface, and the like. The executive subject may receive the external input sound message through a sound collecting device, such as a microphone, to obtain a speech instruction of the user.

At 1104, it is determined that the sound message is associated with the first audio message in content.

In this step, taking the example that the executive subject is an in-vehicle terminal, the in-vehicle terminal may determine whether the sound message is related to the first audio message in content, for example, the speech instruction "the first option", or "the next option", or "next page" or "confirm", or "back to main menu", or "exit" said by the user.

The in-vehicle terminal may determine the association between the sound message and the content of the first audio message in real time. For example, when the display content corresponding to the first audio message is a plurality of options, the in-vehicle terminal may determine, through program and algorithm such as a correlation judgment model, that the user's speech instruction of "first option" or "next page" or "confirm" or "return to the main menu" or "exit" or the like is related to the currently played first audio message, and the speech instruction of "the weather is good today", "very poor road condition", or the like is irrelevant to the currently played first audio message. In step 1104, it is determined that the sound message is associated with the first audio message in content, and the method proceeds to a subsequent processing step.

At 1106, the playing of the first audio message is stopped.

In this step, when it is determined that the sound message is associated with the first audio message in content, it is determined that the sound message is a speech interruption instruction, and the first audio message may be stopped according to the instruction.

For example, when the in-vehicle terminal plays the picklist, the sound message sent by the user is received, and it is determined in the background program of the in-vehicle terminal that the sound message is associated with the first audio message, it is deemed that the user has given the instruction for the next step, and there is no need to continue playing the first audio message. In this step, the speech interruption processing may be performed to stop playing the first audio message currently being played.

In summary, the audio processing method proposed in this example embodiment has at least the following advantages.

The audio processing method of the present disclosure may determine the correlation between the received sound message and the currently played first audio message and stop playing the current first audio message when the correlation is determined. The audio processing method provided by the present disclosure may determine the content association between the sound message and the first audio message in real time, so that the executive subject recognizes the sound message sent by the user more quickly and accurately and performs a speech interruption operation according to the sound message, thereby improving the accuracy and efficiency of recognition.

Seventh Example Embodiment

Figure 12:
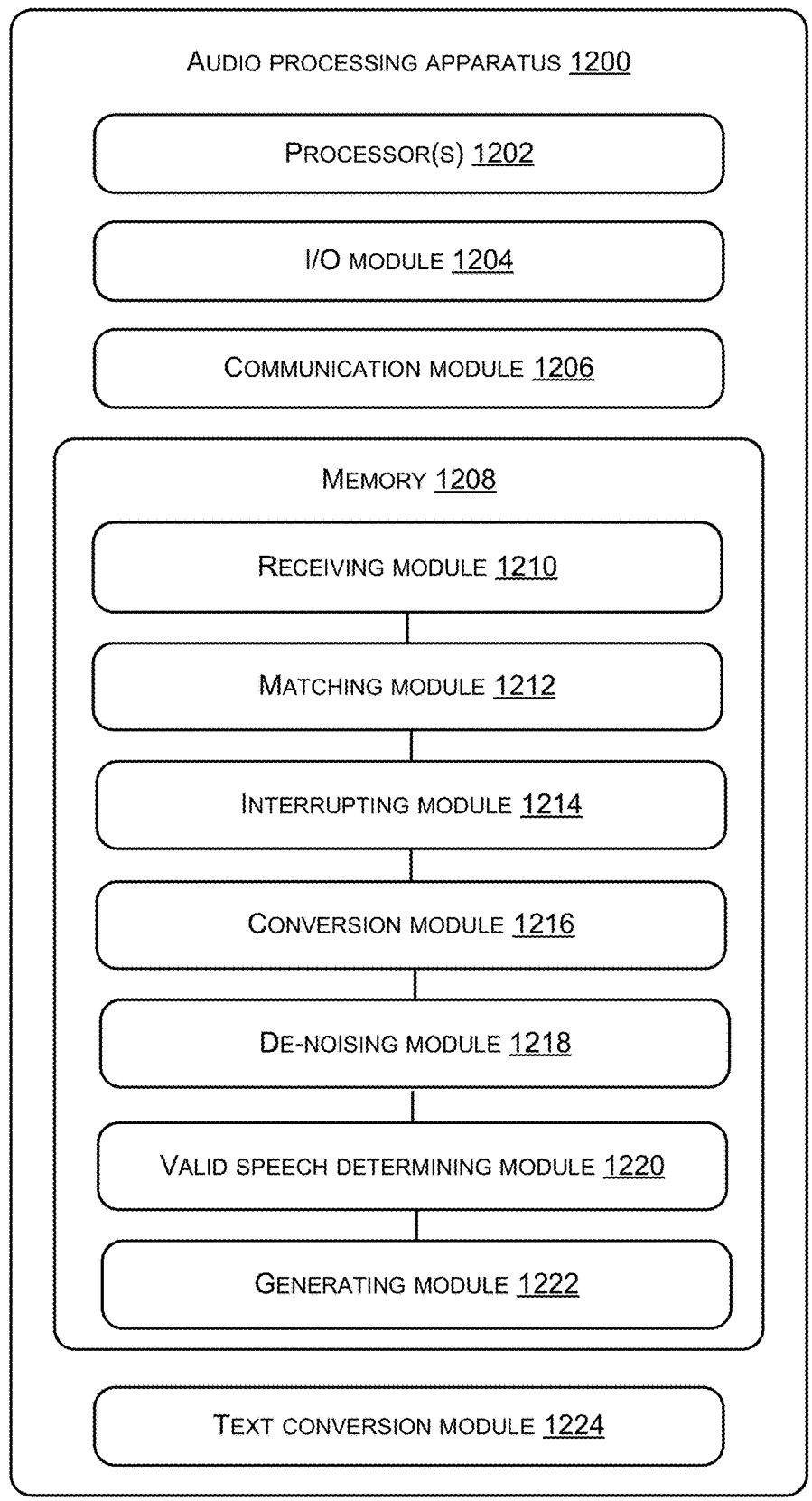
FIG. 12 is a block diagram of an audio processing apparatus according to a seventh example embodiment of the present disclosure.

The seventh example embodiment of the present disclosure provides an audio processing device. FIG. 12 is a schematic block diagram of an audio processing device 1200. As shown in FIG. 12, the audio processing device 1200 includes one or more processors 1202, an input/output module 1204, a communication module 1206, and a memory 1208. The input/output module 1204 is configured to receive data/signal to be processed, and to output the processed data/signal. The communication module 1206 is configured to allow the system 1200 to communicate with other devices (not shown) over a network (not shown). The memory 1208 stores thereon computer-executable modules executable by the one or more processors 1202, the computer-executable modules include the following.

A receiving module 1210 is configured to receive an external input sound message during playing the first audio message.

A matching module 1212 is configured to match the sound message with the receiving message, wherein the receiving message is associated with the first audio message in content.

An interrupting module 1212 is configured to stop playing the first audio message when determining that the matching result meets a threshold.

In an example embodiment, the device further includes a conversion module 1216 configured to convert the sound message into a sequence of characters, wherein the receiving message includes a sequence of characters corresponding to at least one option in the first audio message.

In an example embodiment, the device further includes a denoising module 1218 configured to perform denoising processing on the sound message.

In an example embodiment, the device further includes a valid speech determining module 1212 configured to perform speech validity detection on the sound message.

In an example embodiment, the device further includes a generating module 1220 configured to generate an associated receiving message list according to the first audio message.

In an example embodiment, after the step of receiving the external input sound message during the playing of the first audio message, the apparatus further includes a conversion module configured to convert a valid speech into a sequence of characters when it is determined that the sound message is the valid speech.

The receiving message includes a sequence of characters corresponding to at least one option in the first audio message.

In an example embodiment, the device 1200 further includes a text conversion module 1224 configured to convert the sound message into a text message.

The receiving message includes textual content corresponding to at least one option in the first audio message.

In summary, the audio processing device proposed in this example embodiment has at least the following advantages.

The audio processing device provided by the present disclosure may set a receiving message for the first audio message, compare the received sound message with the receiving message, and stop playing the current first audio message when the sound message matches one of the receiving messages. Due to the existence of the receiving message, the audio processing method provided by the present disclosure may recognize the sound message sent by the user more quickly and accurately and perform a speech interruption operation according to the sound message, thereby improving the accuracy and efficiency of the recognition In addition, the audio processing device proposed in this example embodiment further includes at least the following advantages.

The audio processing apparatus proposed by the present disclosure does not completely rely on the processing result of the existing echo cancellation technology but may allow a certain tone residual in the echo cancellation algorithm. In addition, the audio processing method provided by the example embodiment of the present disclosure does not completely rely on the voice activity detection technology for speech interruption determination. The example embodiment of the present disclosure combines the sound message sent by the user and the receiving message to make the determination more accurate and, being more stable against the interference of the environmental noise and highly robust. Furthermore, the audio processing method provided by the example embodiment of the present disclosure does not respond to the speech unrelated to the first sound message. An interruption event is determined only when the speech content spoken by the user is related to the current conversation scene, thereby effectively avoiding the noise interference of the surrounding environment, avoiding the occurrence of accidental interruption, and saving the calculation processing resources.

For the device example embodiment, which is basically similar to the method example embodiment, the description thereof is relatively simple. The relevant parts may be referred to the description of the method example embodiment.

Figure 13:
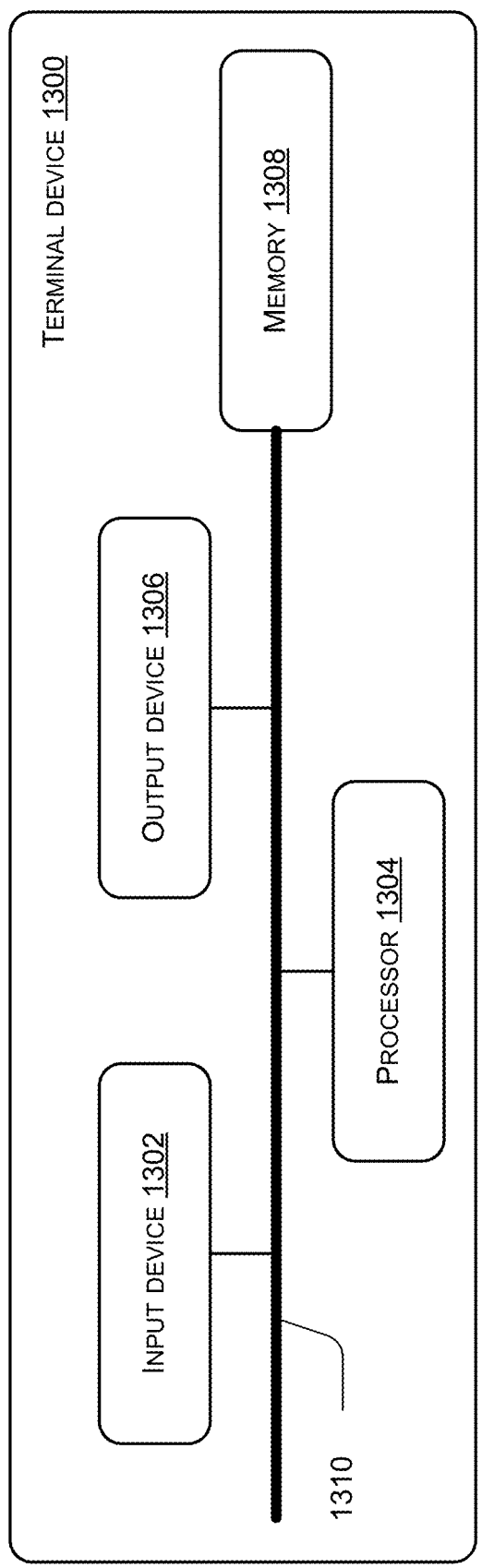
FIG. 13 schematically shows a block diagram of a terminal device for carrying out the method according to the application.

FIG. 13 is a schematic structural diagram of the hardware of a terminal device 1300 according to an example embodiment of the present disclosure. As shown in FIG. 13, the terminal device 1300 may include an input device 1302, a processor 1304, an output device 1306, a memory 1308, and at least one communication bus 1310. Communication bus 1310 is used to implement a communication connection between components. Memory 1308 may include high-speed RAM memory, and may also include non-volatile memory NVM, such as at least one disk memory. Various programs may be stored in memory 1308 for performing various processing functions and implementing the steps of the method of the present example embodiments.

In an example embodiment the above processor 1304 may be implemented by, for example, a central processing unit (CPU), an application specific integrated circuit (ASIC), a digital signal processor (DSP), a digital signal processing device (DSPD), and a programmable logic. A device (PLD), field programmable gate array (FPGA), controller, microcontroller, microprocessor or other electronic components. The processor 1304 that is coupled to the input device 1302 and the output device 1306 by a wired or wireless connection.

In an example embodiment the above input device 1302 may include multiple input devices, for example, at least one of a user-oriented user interface, a device-oriented device interface, a software programmable interface, a camera, and a sensor. In an example embodiment the device-oriented device interface may be a wired interface for data transmission between the devices, or may be a hardware insertion interface (for example, a USB interface, a serial port, etc.) for data transmission between devices. In an example embodiment the user-oriented user interface may be, for example, a user-oriented control button, a voice input device for receiving voice input, and a touch-sensing device for receiving a user's touch input (for example, a touch screen, a touch panel, etc., with touch sensing function). In an example embodiment the above programmable interface of the software may be, for example, an entry for the user to edit or modify the program, such as an input pin interface or an input interface of the chip. In an example embodiment the above transceiver may have radio frequency transceiver chip with communication functions, baseband processing chip, and transceiver antenna. Audio input devices such as microphones and the like may receive voice data. Output device 1306 may include output devices such as displays, stereos, and the like.

In this example embodiment, the processor of the terminal device includes functions for executing each module of the data processing device in each device. The specific functions and technical effects may be referred to the foregoing example embodiments, and details are not described herein again.

Figure 14:
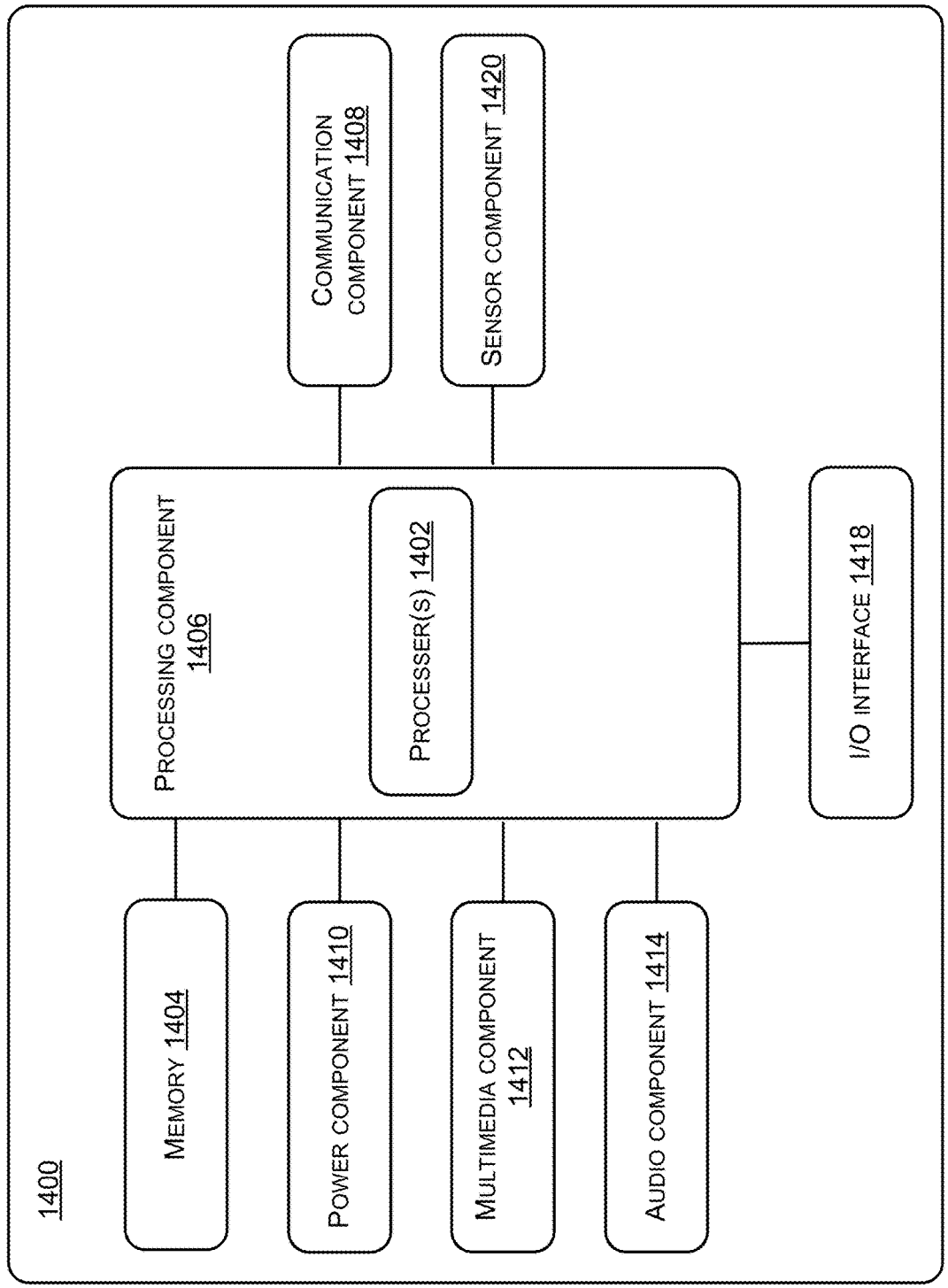
FIG. 14 schematically shows a storage unit for storing or carrying program code implementing the method according to the application.

FIG. 14 is a schematic structural diagram of the hardware of a terminal device 1400 according to another example embodiment of the present disclosure. FIG. 14 is a specific example embodiment of the implementation of FIG. 13. As shown in FIG. 14, the terminal device 1400 of this example embodiment includes a processor 1402 and a memory 1404.

The processor 1402 executes the computer program code stored in the memory 1404 to implement the methods of FIGS. 1 to 9 and 11 in the above example embodiment.

The memory 1404 is configured to store various types of data to support operation at the terminal device 1400. Examples of such data include instructions for any application or method operating on the terminal device, such as messages, pictures, videos, and the like. The memory 1404 may include a random access memory (RAM), and may also include a non-volatile memory such as at least one disk storage.

In an example embodiment, the processor 1402 is disposed in the processing component 1406. The terminal device may also include a communication component 1408, a power component 1410, a multimedia component 1412, an audio component 1414, an input/output interface 1418, and/or a sensor component 1420. The components and the like included in the terminal device are set according to actual requirements, which is not limited in this example embodiment.

Processing component 1406 typically controls the overall operation of the terminal device. Processing component 1406 may include one or more processors 1402 to execute instructions to perform all or some of the steps of the method of the above FIGS. 1 to 9 and 11. Moreover, processing component 1406 may include one or more modules to facilitate interaction between the processing component 1406 and other components. For example, processing component 1406 may include a multimedia module to facilitate interaction between multimedia component 1412 and processing component 1406.

Power component 1410 provides power to various components of the terminal device. Power component 1410 may include a power management system, one or more power sources, and other components associated with generating, managing, and distributing power for the terminal devices.

The multimedia component 1412 includes a display screen between the terminal device and the user that provides an output interface. In some example embodiments, the display screen may include a liquid crystal display (LCD) and a touch panel (TP). If the display includes a touch panel, the display may be implemented as a touch screen to receive input signals from the user. The touch panel includes one or more touch sensors to sense touches, swipes, and gestures on the touch panel. The touch sensor may sense not only the boundary of the touch or sliding action, but also the duration and pressure associated with the touch or sliding action.

The audio component 1414 is configured to output and/or input an audio signal. For example, the audio component 1414 includes a microphone (MIC) that is configured to receive an external audio signal when the terminal device is in an operational mode, such as a speech recognition mode. The received audio signal may be further stored in memory 1404 or transmitted via communication component 1408. In some example embodiments, the audio component 1414 also includes a speaker for outputting an audio signal.

The input/output interface 1418 provides an interface between the processing component 1406 and the peripheral interface module, which may be a click wheel, a button, or the like. These buttons may include, but are not limited to, a volume button, a start button, and a lock button.

The sensor component 1420 includes one or more sensors for providing a status assessment of various aspects to the terminal device. For example, the sensor component 1420 may detect the on/off state of the terminal device, the relative positioning of the components, and the presence or absence of contact of the user with the terminal device. The sensor component 1420 may include a proximity sensor configured to detect the presence of nearby objects without any physical contact, including detecting the distance between the user and the terminal device. In some example embodiments, the sensor component 1420 may also include a camera or the like.

The communication component 1408 is configured to facilitate wired or wireless communication between the terminal device and other devices. The terminal device may access a wireless network based on a communication standard such as WiFi, 2G, 3G, or a combination thereof. In an example embodiment, the terminal device may include a SIM card slot for inserting the SIM card, so that the terminal device may log in to the GPRS network and establish communication with the server through the Internet.

In view of the above, the communication component 1408, the audio component 1414, and the input/output interface 1418, and the sensor component 1420 involved in the example embodiment of FIG. 14 may be implementations of the input device in the example embodiment of FIG. 13.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-14. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The various example embodiments in the present specification are described in a progressive manner, and each example embodiment focuses on differences from other example embodiments. The same or similar parts between the various example embodiments may be referred to each other.

Though example embodiments of the present disclosure have been described, those skilled in the art can make additional changes and modifications to the example embodiments once knowing the present disclosure. Therefore, the appended claims are intended to be interpreted as including example embodiments and all the modifications and modifications falling within the scope of example embodiments of the present disclosure.

Finally, it should also be noted that in this context, relational terms such as first and second are used merely to distinguish one entity or operation from another entity or operation, and do not necessarily require or imply any such actual relationship or order between these entities or operations. Furthermore, the terms "comprise," "include", or any other variations are intended to cover non-exclusive inclusion, such that a process, a method, an article, or a terminal device which includes a series of elements not only include those elements, but also include other elements that are not listed explicitly, or inherent elements of such process, method, article, or terminal device. Without further limitation, an element defined by the phrase "comprising a . . . " does not exclude the presence of additional identical elements in the process, the method, the article, or the terminal device that includes the element.

The audio processing method, device, and terminal device provided by the present disclosure are described in detail. The principles and implementation manners of the present disclosure are described with reference to specific examples. The description of the above example embodiments is only used to help understand the method of the present. Meanwhile, for those of ordinary skill in the art, according to the idea of the present disclosure, there may be changes in the specific implementation manner and application scope. In summary, the content of this specification should not be understood to be a limitation on the present disclosure.

Example Clauses

Clause 1. An audio processing method, comprising: receiving an external input sound message during playing a first audio message; matching the sound message with a receiving message, wherein the receiving message is associated with the first audio message in content; and in case of determining that a matching result meets a threshold, stopping playing the first audio message.

Clause 2. The method according to clause 1, wherein after the step of receiving the external input sound message during playing the first audio message, the method further comprises: converting the sound message into a sequence of character; wherein the receiving message includes a sequence of characters corresponding to at least one option in the first audio message.

Clause 3. The method according to clause 2, wherein the sequence of characters is a sequence of Chinese pinyin characters.

Clause 4. The method according to clause 2, wherein the sequence of characters is a sequence of other language characters other than Chinese Pinyin.

Clause 5. The method according to clause 1, wherein after the step of receiving the external input sound message during playing the first audio message, the method further comprises: performing denoising processing on the sound message.

Clause 6. The method according to clause 1, wherein after the step of receiving the external input sound message during playing the first audio message, the method further comprises: performing voice validity detection on the sound message.

Clause 7. The method according to clause 1, wherein the method further comprises: generating an associated receiving message list according to the first audio message.

Clause 8. The method according to clause 7, wherein the receiving message list is an inverted index list.

Clause 9. The method according to clause 1, wherein determining that the matching result meets the threshold comprises: determining that a proportion of sound units in the sound message hitting sound units in the receiving message is greater than the threshold.

Clause 10. The method according to clause 1, wherein the external input sound message is a sound message received by an acoustic sensor.

Clause 11. The method according to clause 1, wherein after the step of determining that the matching result meets the threshold, stopping playing the first audio message, the method further comprises: executing an instruction corresponding to the sound message.

Clause 12. An audio processing method for an in-vehicle terminal, comprising: receiving a sound message collected from an in-vehicle environment during playing a first audio message; matching the sound message with a receiving message, wherein the receiving message is associated with the first audio message in content; and in case of determining that a matching result meets a threshold, stopping playing the first audio message by the in-vehicle terminal.

Clause 13. The method according to clause 12, wherein after the step of determining that the matching result meets the threshold value, stopping playing the first audio message by the in-vehicle terminal, the method further comprises: performing an instruction corresponding to the sound message by the in-vehicle terminal.

Clause 14. A method for processing audio of a mobile client, comprising: receiving a sound message collected from a sound collecting device of the mobile client during playing a first audio message; matching the sound message with a receiving message, wherein the receiving message is associated with the first audio message in content; and in case of determining that a matching result meets a threshold, stopping playing the first audio message by the mobile client.

Clause 15. An audio processing method for a smart device, comprising: receiving a sound message collected from a sound collecting device of the smart device during playing a first audio message; matching the sound message with receiving message, wherein the receiving message is associated with the first audio message in content; and in case of determining that a matching result meets a threshold, stopping playing the first audio message by the smart device.

Clause 16. The method of clause 15 wherein the smart device comprises a smart household item.

Clause 17. An audio processing device, comprising: a receiving module, configured to receive an external input sound message during playing a first audio message; a matching module, configured to match the sound message with receiving message, wherein the receiving message is associated with the first audio message in content; and an interrupting module, configured to stop playing the first audio message in case of determining that a matching result meets a threshold.

Clause 18. A terminal device, comprising: one or more processors; and one or more machine-readable media, stored thereon instructions that, when executed by the one or more processors, cause the terminal device to perform the method of one or more of clauses 1-16.

Clause 19. One or more machine-readable media, stored thereon instructions that, when executed by one or more processors, cause the terminal device to perform the method of one or more of clauses 1-16.

Clause 20. An intelligent vehicle, comprising the terminal device of clause 18.

Clause 21. An audio processing method, comprising: receiving an external input sound message during playing a first audio message; determining that the sound message is associated with the first audio message in content; and stopping playing the first audio message.

What is claimed is:

1. A method, comprising:
   receiving an external input sound message during playing a first audio message;
   matching the external input sound message with a receiving message pre-stored in a storage area or a database to obtain a matching result, wherein the receiving message is associated with the first audio message in content, wherein the matching is based on a proportion of sound units in the sound message that hit sound units in the receiving message;
   determining whether the matching result meets a threshold; and
   upon determining that the matching result meets the threshold, determining that the sound message is a speech interruption instruction, and stop playing of the first audio message.

2. The method according to claim 1, wherein after receiving the external input sound message during playing the first audio message, the method further comprises:
   converting the sound message into a first sequence of characters;
   wherein the receiving message includes a second sequence of characters corresponding to at least one option in the first audio message.

3. The method according to claim 2, wherein the second sequence of characters is a sequence of Chinese pinyin characters.

4. The method according to claim 2, wherein the second sequence of characters is a sequence of other language characters other than Chinese Pinyin.

5. The method according to claim 1, wherein the method further comprises:
   generating a receiving message list according to the first audio message.

6. The method according to claim 5, wherein the receiving message list is an inverted index list.

7. The method according to claim 1, wherein after receiving the external input sound message during playing the first audio message, the method further comprises performing denoising processing on the external input sound message.

8. The method according to claim 1, wherein after receiving the external input sound message during playing the first audio message, the method further comprises:
   performing voice validity detection on the external input sound message.

9. The method according to claim 1, wherein determining whether the matching result meets the threshold comprises:
   determining whether a proportion of sound units in the sound message hitting sound units in the receiving message is greater than the threshold.

10. The method according to claim 1, wherein the external input sound message is a sound message received by an acoustic sensor.

11. The method according to claim 1, wherein after determining that the matching result meets the threshold, stopping playing the first audio message, the method further comprises:
    executing an instruction corresponding to the sound message.

12. An apparatus, comprising:
    one or more processors; and
    memory communicatively coupled to the one or more processors, the memory storing computer-executable modules executable by the one or more processors, the computer-executable modules including:

a receiving module, configured to receive an external input sound message during playing a first audio message;

a matching module, configured to match the external input sound message with a receiving message pre-stored in a storage area or a database to obtain a matching result and determine whether the matching result meets a threshold, wherein the receiving message is associated with the first audio message in content, wherein the matching is based on a proportion of sound units in the sound message that hit sound units in the receiving message; and an interrupting module, configured to determine that the sound message is a speech interruption instruction, and stop playing the first audio message upon determining that the matching result meets the threshold.

13. The apparatus according to claim 12, further comprising a conversion module, configured to convert the sound message into a first sequence of characters, wherein the receiving message includes a second sequence of characters corresponding to at least one option in the first audio message.

14. The apparatus according to claim 13, wherein the second sequence of characters is a sequence of Chinese pinyin characters.

15. The apparatus according to claim 13, wherein the second sequence of characters is a sequence of other language characters other than Chinese Pinyin.

16. The apparatus according to claim 12, further comprising a denoising module, configured to perform denoising processing on the external input sound message.

17. The apparatus according to claim 12, further comprising a valid speech determining module, configured to perform voice validity detection on the external input sound message.

18. The apparatus of claim 12, further comprising a generating module, configured to generate a receiving message list according to the first audio message.

19. One or more non-transitory computer-readable media, stored thereon instructions that, when executed by one or more processors, cause the one or more processors to perform acts including:

receiving an external input sound message during playing a first audio message;

matching the external input sound message with a receiving message pre-stored in a storage area or a database to obtain a matching result, wherein the receiving message is associated with the first audio message in content, wherein the matching is based on a proportion of sound units in the sound message that hit sound units in the receiving message;

determining whether the matching result meets a threshold; and upon determining that the matching result meets the threshold, determining that the sound message is a speech interruption instruction, and stop playing of the first audio message.

20. The one or more computer-readable media of claim 19, wherein after receiving the external input sound message during playing the first audio message, the acts further comprise:

converting the sound message into a first sequence of characters;

wherein the receiving message includes a second sequence of characters corresponding to at least one option in the first audio message.

* * * * *